US010933676B1

(12) United States Patent
Robles Flores

(10) Patent No.: US 10,933,676 B1
(45) Date of Patent: Mar. 2, 2021

(54) METHOD AND APPARATUS TO PRINT A SECURITY MARK VIA NON-FLUORESCENT TONER

(71) Applicant: Xerox Corporation, Norwalk, CT (US)

(72) Inventor: Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/571,884

(22) Filed: Sep. 16, 2019

(51) Int. Cl.

*H04N 1/40* (2006.01)
*B41M 3/14* (2006.01)
*B42D 25/405* (2014.01)
*B42D 25/387* (2014.01)
*B42D 25/378* (2014.01)

(52) U.S. Cl.

CPC ............. *B41M 3/14* (2013.01); *B42D 25/378* (2014.10); *B42D 25/387* (2014.10); *B42D 25/405* (2014.10)

(58) Field of Classification Search

None
See application file for complete search history.

(56) References Cited

U.S. PATENT DOCUMENTS 4,513,992 A * 4/1985 May ........................ B41M 3/14 101/194
5,826,916 A * 10/1998 Phillips .................... B41M 3/14 283/91
7,636,451 B2 * 12/2009 Isogai ................... G06T 1/0085 382/100
2006/0158688 A1 * 7/2006 Mori .................. H04N 1/00238 358/1.15
2007/0071282 A1 * 3/2007 Isogai ................... G06T 1/0085 382/100
2007/0091352 A1 * 4/2007 Nakata ............... H04N 1/00883 358/1.14
2007/0127055 A1 * 6/2007 Kujirai ................. G03G 21/043 358/1.14
2008/0191462 A1 * 8/2008 Depta .................. B42D 25/373 283/110
2008/0199785 A1 * 8/2008 Bala ....................... B41M 3/144 430/5
2009/0122349 A1 * 5/2009 Bala .................. H04N 1/32256 358/3.28
2010/0157377 A1 * 6/2010 Zhao .................... B42D 25/333 358/3.28
2017/0277106 A1 * 9/2017 Baba .................. G03G 15/2021

* cited by examiner

*Primary Examiner* — Dung D Tran

(57) ABSTRACT

A method and apparatus for printing a security mark via a non-fluorescent toner is disclosed. For example, the method may be executed by a processor and includes receiving an electronic file of a security mark to be printed on a substrate, determining an amount of halftone coverage for a non-fluorescent toner based on a brightness of the substrate, converting the electronic file of the security mark into a printer description language with the amount of halftone coverage that is determined, and causing the security mark to be printed on the substrate.

20 Claims, 5 Drawing Sheets

METHOD AND APPARATUS TO PRINT A SECURITY MARK VIA NON-FLUORESCENT TONER

The present disclosure relates generally to printing security marks and relates more particularly to a method and apparatus to print a security mark via white toner.

BACKGROUND

Document security can be used for a variety of different applications. For example, document security can be used to prevent forgery of certain documents (e.g., tickets, confidential documents, and the like).

Some examples of document security include using a watermark. Some watermarks can be printed using micro-printing. Micro-printing uses very small printed marks that are invisible to the naked eye. However, micro-printing relies on resolution and quality of the printer. The equipment used for micro-printing can be very expensive. Other methods may rely on specialty inks or toners that can also be very expensive.

SUMMARY

According to aspects illustrated herein, there are provided a method, a non-transitory computer readable medium, and apparatus to print a security mark via a non-fluorescent toner One disclosed feature of the embodiments is a method that comprises receiving an electronic file of a security mark to be printed on a substrate, determining an amount of halftone coverage for a non-fluorescent toner based on a brightness of the substrate, converting the electronic file of the security mark into a printer description language with the amount of halftone coverage that is determined, and causing the security mark to be printed on the substrate.

Another disclosed feature of the embodiments is a non-transitory computer-readable medium having stored thereon a plurality of instructions, the plurality of instructions including instructions which, when executed by a processor, cause the processor to perform operations to print a security mark via a non-fluorescent toner. The instructions include instructions to receive an electronic file of a security mark to be printed on a substrate, determine an amount of halftone coverage for a non-fluorescent toner based on a brightness of the substrate, convert the electronic file of the security mark into a printer description language with the amount of halftone coverage that is determined, and cause the security mark to be printed on the substrate.

Another disclosed feature of the embodiments is an apparatus comprising a processor and a non-transitory computer readable medium that stores instructions executed by the processor. The instructions comprise instructions to receive an electronic file of a security mark to be printed on a substrate, determine an amount of halftone coverage for a non-fluorescent toner based on a brightness of the substrate, convert the electronic file of the security mark into a printer description language with the amount of halftone coverage that is determined, and cause the security mark to be printed on the substrate.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to print a security mark via non-fluorescent toners. As discussed above, document security can be used for a variety of different applications. For example, document security can be used to prevent forgery of certain documents (e.g., tickets, confidential documents, and the like). However, current methods rely on expensive equipment or expensive specialty inks and toners.

The present disclosure provides a method and apparatus that uses a lower cost non-fluorescent toner that is readily available and can be used by most printers or multi-function devices. The present disclosure takes advantage of the fluorescence in the substrate to create the security mark. The non-fluorescent toner may have a lower fluorescence than the substrate. The non-fluorescent toner can be printed at half tone levels such that the security mark is invisible to the naked eye, but at a difference in brightness such that the security mark can be seen under certain light.

In one embodiment, the security mark can be printed such that the non-fluorescent toner "outlines" the mark on the substrate. The non-fluorescent toner may appear black under certain light, and the fluorescence of the substrate may be shown under certain light. Thus, the present disclosure provides a low cost solution using readily available non-fluorescent toners to print security marks on substrates.

Figure 1:
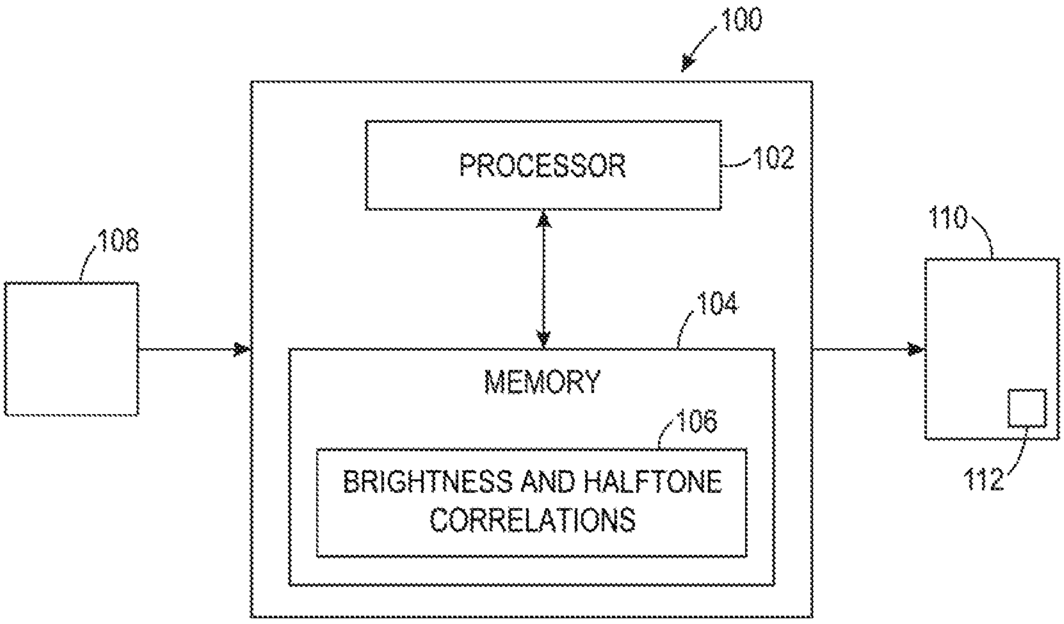
FIG. 1 illustrates a block diagram of a printer that prints security marks via white toner of the present disclosure.

FIG. 1 illustrates an example apparatus 100. The apparatus 100 may be a laser printer, an inkjet printer, a multi-function device, or any other type of device that can print images onto a substrate 110. The apparatus 100 has been simplified for ease of explanation and may include other components that are not shown. For example, the apparatus 100 may include a paper feed, a printing path, a finishing module, and the like. The apparatus 100 may include toner or ink cartridges to dispense printing fluid. The apparatus 100 may print in color or black and white.

The apparatus 100 may include other processing components such as a digital front end that can convert an electronic file of a security mark 108 into a printer description language (PDL) that can be understood by the apparatus 100 to print a security mark 112 on the substrate 110.

In one embodiment, the apparatus 100 may include a processor 102 and a memory 104. The processor 102 may be communicatively coupled to the memory 104. The memory 104 may be a non-transitory computer readable memory that may store instructions executed by the processor 102 or information used by the processor 102 to perform the functions described herein.

In one embodiment, the memory 104 may store brightness and halftone correlations 106. The brightness and halftone correlations 106 may provide information related to a proper amount of halftone coverage for a security mark 112 given a brightness or an amount of fluorescence of the substrate 110 and/or a size or type of image (e.g., a small text, large text, solids, barcodes, graphics, and the like) of the security mark 112.

The apparatus 100 may use widely available toner or ink to print the security mark 112. The toner or ink may be the same color as the color of the substrate 110. For example, the toner and substrate 110 may both be yellow, white, and the like. In one example, the toner may be white dry ink toner and the substrate 110 may be a white substrate that contains brighteners or fluorescence to increase the brightness of the substrate. In one embodiment, white dry ink may be used, as the white dry ink can be dispensed in very low halftone levels while still dispensing at 3 times more mass than other colors (e.g., yellow) and still not be visible.

The toner or ink may not include any, or may include a minimal amount of, fluorescence or brighteners. In one embodiment, the brightness of the toner or ink may be less than the brightness of the substrate 110.

The security mark 112 may be printed using toner or ink such that the security mark 112 appears under a certain type of light (e.g., an ultra violet (UV) light) due to the brightness of the substrate 110. In other words, the security mark 112 may appear under the light due to the brightness of the substrate 110 and not the brightness or characteristics of the toner or ink. The toner or ink may appear dark under the light and may block the brightness of the substrate 110 to create the security mark 112. In other words, security mark 112 may be printed as a negative image of the electronic file of the security mark 108.

To illustrate, the electronic file of the security mark 108 may be received by the apparatus 100. The electronic file of the security mark 108 may be created on a separate endpoint device (not shown) and transmitted to the apparatus 100 for printing.

The processor 102 may then access the brightness and halftone correlations 106 stored in the memory 104 to determine an amount of halftone coverage per pixel for the security mark in the electronic file 108. As noted above, the amount of halftone coverage may be a function of a brightness of the substrate 110 and/or a size of the images in the security mark in the electronic file 108. The amount of halftone coverage may be a percentage that is predefined for different colors, types of images, size of images, and brightness levels (or amount of fluorescence) of the substrate 110.

Figure 2:
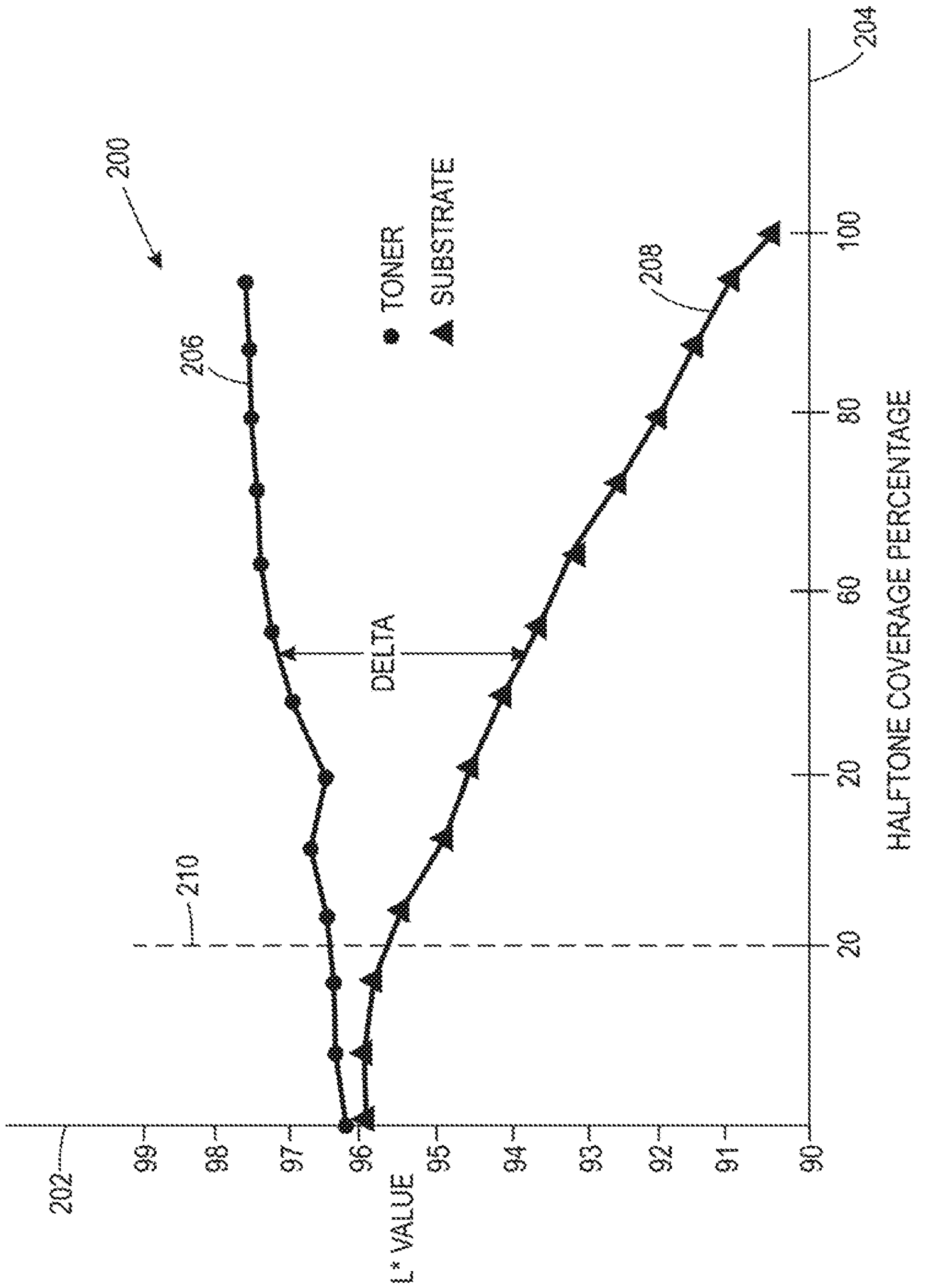
FIG. 2 illustrates an example graph of brightness versus halftone coverage between a substrate and a toner of the present disclosure.

FIG. 2 illustrates an example chart 200 that illustrates how the amount of halftone coverage can be determined. The chart 200 may be one example of a correlation that can be stored in the brightness and halftone correlations 106. For example, the chart 200 may show a correlation between a white toner for a white substrate when a relatively small text is printed as the security mark in the electronic file 108. Different charts 200 may be stored for different correlations between different colored toner and substrates and different sized and/or types of images.

The chart 200 may include a y-axis 202 that shows an amount of brightness or fluorescence. The amount of brightness may be measured as an L* value from an L*a*b* color standard. An x-axis 204 may show a percentage of halftone coverage. The percentage of halftone coverage may be on a per pixel basis. Thus, the percentage may apply to any sized pixel for any printing resolution capability of the apparatus 100.

In one embodiment, the chart 200 may chart the brightness of the toner as the halftone coverage percentage is increased in line 206 and the brightness of the substrate 110 as the halftone coverage percentage is increased in line 208. As can be seen in the chart 200, the brightness of the toner may remain relatively steady even as the halftone percentage increases. However, the brightness of a portion of the substrate (e.g., an area equivalent to a pixel size that receives the percentage of halftone coverage) may decrease as the halftone coverage percentage increases. In other words, less of the substrate is visible as the substrate 110 is covered by more toner.

A difference in the brightness between the line 206 and the line 208 may represent a delta. In one embodiment, a predefined delta may be established to print the security mark in the electronic file 108. FIG. 2 illustrates an example where the predefined delta or brightness threshold is at approximately 20% halftone overage as shown by line 210. In one embodiment, the brightness threshold may be a range of halftone coverage percentages. For example, the amount of halftone coverage percentage may be approximately 10% to 20% or 5% to 20%.

The predefined delta or brightness threshold 210 may be a point where there is enough delta in brightness such that the security mark 112 may be visible when printed on the substrate 110 and viewed under UV light, but close enough that the security mark 112 is not visible when viewed without UV light. In one embodiment, the predefined brightness threshold may be a delta that corresponds to a halftone coverage percentage. For example, the brightness delta may be a brightness of less than 1 unit of L* brightness that corresponds to approximately 20% halftone coverage. In one embodiment, the predefined brightness threshold may be a range (e.g., a delta of at least 0.1 unit of L* brightness and less than 1 unit of L* brightness that corresponds to a halftone coverage percentage between approximately 5% and 20%).

Figure 3:
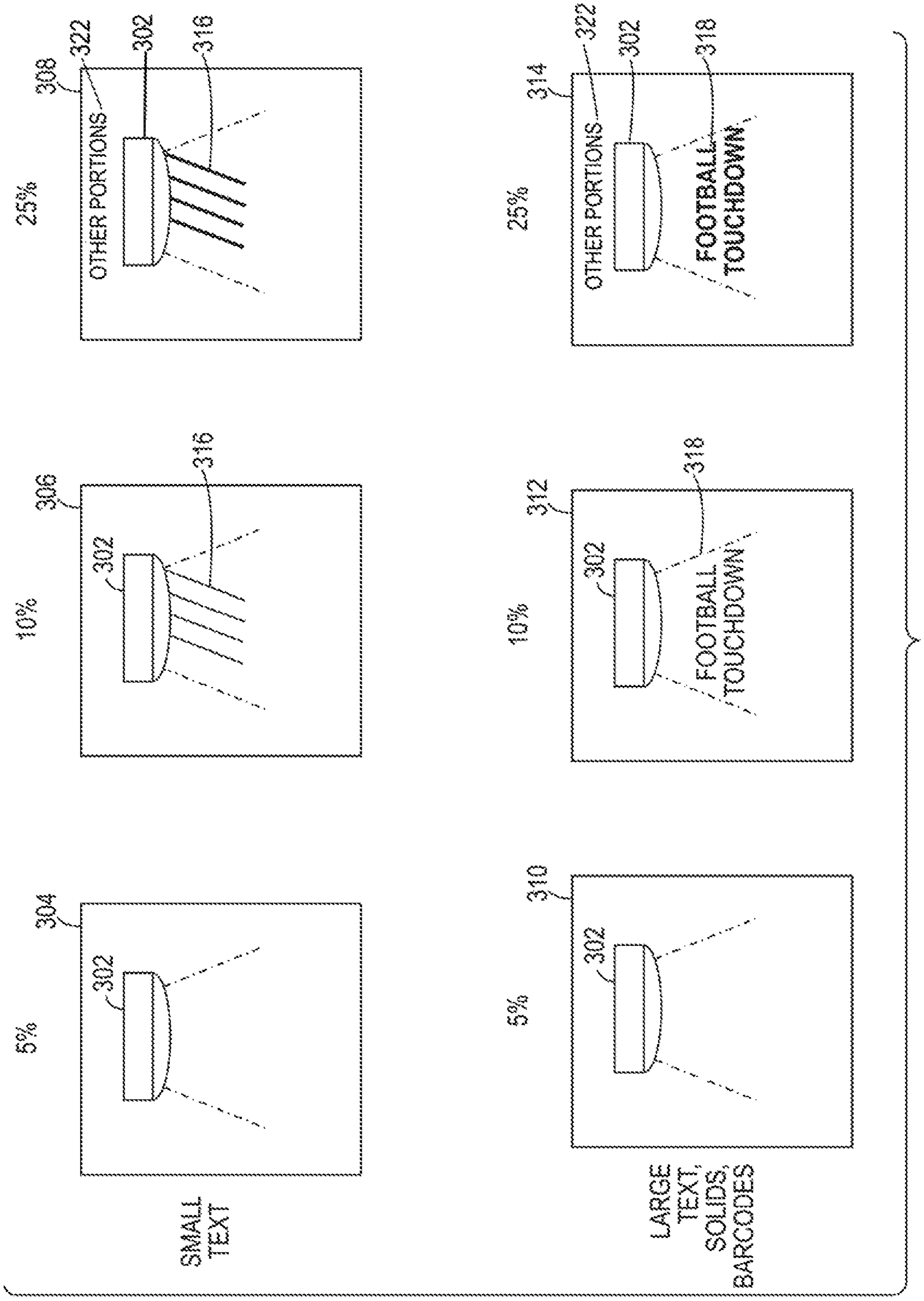
FIG. 3 illustrates an example of different security marks printed at various sizes and halftone levels of the present disclosure.

FIG. 3 illustrates how the different amounts of halftone coverage can change the ability to see the security mark 112 printed on the substrate 110. FIG. 3 illustrates six different examples 304, 306, 308, 310, 312, and 314. In one example, the examples 304, 306, 308, 310, 312, and 314 may illustrate an example of a white substrate using white dry ink similar to the chart 200 illustrated in FIG. 2. The example 304, 306, and 308 illustrate examples of a "small text" security image that is printed at a 5% halftone coverage, a 10% halftone coverage, and a 25% halftone coverage. In one embodiment, small text may include text that is printed in 10 point font size or less, single lines, and the like.

The examples 310, 312, and 314 illustrate examples of a "large text" security image that is printed at 5% halftone coverage, a 10% halftone coverage, and a 25% halftone coverage. In one embodiment, large text may include text that is printed in greater than 10 point font size, graphical images, solid images or shapes, barcodes, and the like.

In one embodiment, the example 304 illustrates a 5% halftone coverage percentage for small text. However, at 5% halftone coverage, the delta between the brightness of the substrate and the toner may not be large enough for a security mark to be visible with or without a UV light source 302. At 10% halftone coverage, the example 306 illustrates that a security mark 316 may be visible under the UV light source 302, but may not be visible on other portions of the substrate that are not illuminated by the UV light source 302. In other words, the example 306 may represent a portion of the chart 200 where the delta is large enough such that security mark 316 is visible under the UV light 302, but close enough that the security mark 316 is not visible without the UV light 302.

At 25% halftone coverage, the example 308 illustrates that the security mark 316 may be much more visible under the UV light 302. However, other portions 320 of the security mark 316 that are outside of the UV light 302 may also be visible. For example, the 25% halftone coverage may be greater than the predefined delta or brightness threshold 210. Thus, the security mark 316 may be visible even without the UV light 302. Referring back to FIG. 1, based on the brightness and halftone correlations 106, the processor 102 may determine that for a security mark in the electronic file 108 that has "small text" using white ink and a white substrate, the proper amount of halftone coverage may be approximately 10%.

Referring back to FIG. 3, the example 310 illustrates 5% halftone coverage for large text. However, at 5% halftone coverage, the delta between the brightness of the substrate and the toner may not be large enough for a security mark to be visible with or without a UV light source 302.

At 10% halftone coverage, the example 312 illustrates that a security mark 318 may be visible under the UV light source 302, but may not be visible on other portions of the substrate that are not illuminated by the UV light source 302. In other words, the example 312 may represent a portion of the chart 200 where the delta is large enough such that security mark 318 is visible under the UV light 302, but close enough that the security mark 318 is not visible without the UV light 302.

At 25% halftone coverage, the example 314 illustrates that the security mark 316 may be much more visible under the UV light 302. However, other portions 322 of the security mark 318 that are outside of the UV light 302 may also be visible. For example, the 25% halftone coverage may be greater than the predefined delta or brightness threshold 210. Thus, the security mark 318 may be visible even without the UV light 302. Referring back to FIG. 1, based on the brightness and halftone correlations 106, the processor 102 may determine that for a security mark in the electronic file 108 that has "large text" using white ink and a white substrate, the proper amount of halftone coverage may be approximately 10% or between 5% and 10%.

After the processor 102 determines the proper amount of halftone coverage for the security mark in the electronic file 108, the processor 102 may convert the electronic file 108 into a PDL format. In one embodiment, the processor 102 may also convert the security mark in the electronic file 108 into a negative image. In other words, the security mark in the electronic file 108 may indicate locations where printing fluid would normally be dispensed in a traditional print job. However, since the present disclosure uses the brightness or fluorescence of the substrate 110 to make the security mark 112 appear, the printing fluid may be dispensed to form the outline of the security image in the electronic file 108.

Said another way, for a black and white image, areas that are white (e.g., usually locations that would not receive printing fluid) in the electronic file 108 may be converted to locations that receive printing fluid on the substrate 110. The areas that are black (e.g., usually locations that would receive printing fluid) in the electronic file 108 may be converted to locations that do not receive printing fluid. The negative of the security mark in the electronic file 108 may be included in the PDL format created by the processor 102.

The processor 102 may then cause the apparatus 100 to print the security mark 112 on the substrate 110. As illustrated in FIG. 3, the security mark 112 may not be visible to the naked eye when viewed without a certain type of light. However, when the security mark 112 is viewed under a certain type of light (e.g., a UV light source), the security mark 112 may be visible. Notably, the image of the security mark 112 that is visible may actually be formed by the fluorescence of the substrate 110 and portions of the substrate 110 that are "blocked" or "blackened" by the printing fluid that is dispensed.

In contrast, other methods may print the security mark using expensive or specialty inks and toners. The specialty inks and toners may then be the portion that is visible under the certain types of light. However, as noted above, these specialty inks and toners can be relatively expensive.

Figure 4:
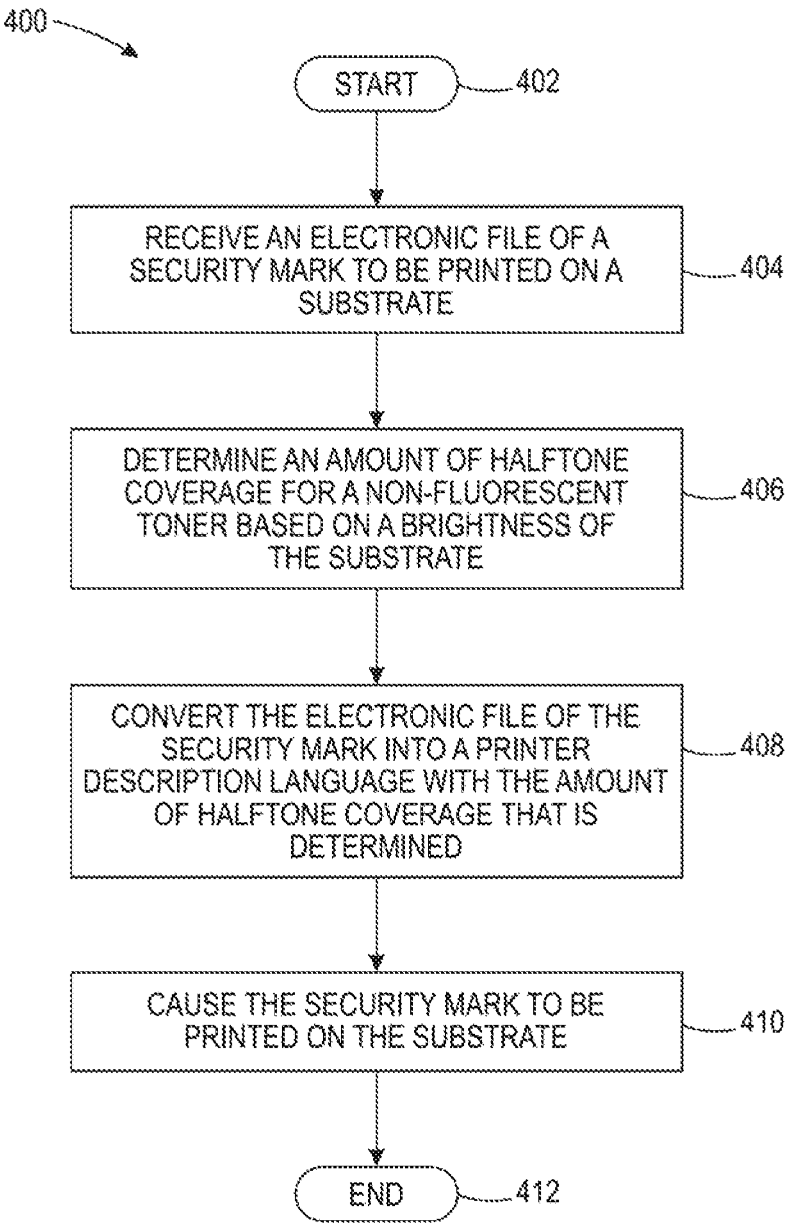
FIG. 4 illustrates a flow chart for an example method for printing a security mark via non-fluorescent toner.
Figure 5:
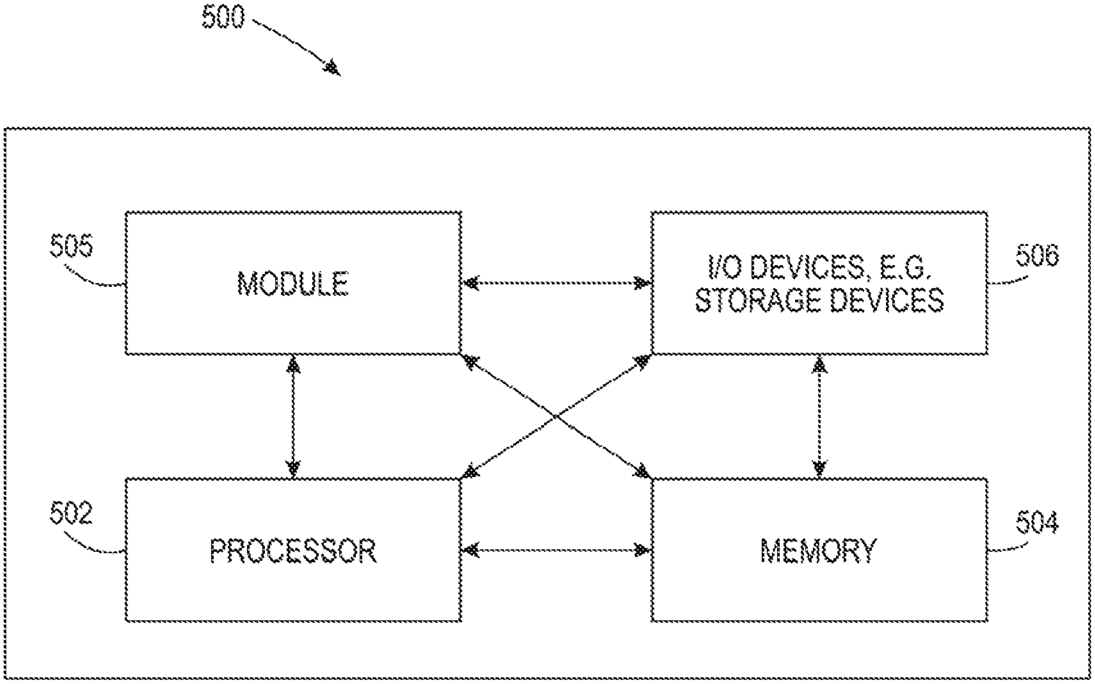
FIG. 5 illustrates a high-level block diagram of an example computer suitable for use in performing the functions described herein.

FIG. 4 illustrates a flowchart of an example method 400 for printing a security mark via non-fluorescent toner of the present disclosure. In one embodiment, one or more blocks of the method 400 may be performed by the apparatus 100, or a computer/processor that controls operation of an apparatus as illustrated in FIG. 5 and discussed below.

At block 402, the method 400 begins. At block 404, the method 400 receives an electronic file of a security mark to be printed on a substrate. For example, the security mark may be generated by a user on a separate endpoint device. The user may then transmit the electronic file with the security mark to an apparatus (e.g., a printer or MFD) to print the security mark on a substrate.

The security mark may be used to prevent unauthorized duplication or prevent fraud. For example, the security mark may be printed on a private document, an event ticket, and the like. When viewed under a certain type of light (e.g., a UV light) the security mark may be visible, providing proof that the document or ticket is authentic.

At block 406, the method 400 determines an amount of halftone coverage for a non-fluorescent toner based on a brightness of the substrate. In one embodiment, a brightness and halftone correlation may be referenced based on a color of the toner, a color of the substrate, and a type and/or size of the image used for the security mark in the electronic file.

As discussed, above the correlation may indicate an amount of halftone coverage per pixel that should be applied. The amount of halftone coverage may be based on a predefined brightness threshold or delta between a brightness of the toner and a brightness of the substrate. The brightness or amount of fluorescence may be measured as a value of L* from an L*a*b* color standard.

The correct amount of halftone coverage per pixel may be provided as a percentage of the area of the pixel. For example, if the pixel is 1 square micron and the halftone percentage is 10%, then 0.1 square micron of the pixel may be covered with toner or ink in a halftone pattern. The correct amount of halftone may allow the security mark to be invisible to the naked eye, but appear under a particular type of light (e.g., a UV light).

In one embodiment, different halftone coverage amounts may be used for different colors of toner and substrate and/or size or type of image used for the security image. The correlations and the proper halftone coverage amounts may be pre-determined and stored in memory of the printer or MFD.

At block 408, the method 400 converts the electronic file of the security mark into a printer description language with the amount of halftone coverage that is determined. The printer description language may be a file that is compatible with the printer or MFD. The printer description language may indicate how much halftone coverage should be applied to each pixel for the security mark.

In one embodiment, the locations on the substrate where printing fluid is dispensed or located may be a negative of the security mark received in the electronic file. For example, the printing fluid in the present disclosure is applied to block the brightness or fluorescence of the substrate under UV light. Thus, the security mark on the substrate that is visible is due to fluorescence of portions of the substrate being visible under the UV light. The other portions are blocked by the printing fluid that is dispensed. In other words, the printing fluid may be dispensed to form an "outline" of the security mark that was received in the electronic file.

At block 410, the method 400 causes the security mark to be printed on the substrate. In one embodiment, the printer description language can be provided to the printer or MFD. The printer or MFD may execute the instructions in the printer description language to print the security mark on the substrate. The security mark may be printed in accordance with the amount of halftone coverage per pixel that was determined in the block 406. As a result, the security mark may be invisible to the naked eye and visible when viewed under certain types of light (e.g., a UV light). At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for printing a security mark via non-fluorescent toner, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for printing a security mark via non-fluorescent toner (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for printing a security mark via non-fluorescent toner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing a security mark via a non-fluorescent toner, comprising:

receiving, by a processor, an electronic file of a security mark to be printed on a substrate;

determining, by the processor, an amount of halftone coverage for a non-fluorescent toner based on a brightness and halftone correlation stored in memory, wherein the brightness and halftone correlation indicates the amount of halftone coverage of the security mark given a brightness of the substrate, a size of an image of the security mark, and a type of the image of the security mark;

converting, by the processor, the electronic file of the security mark into a printer description language with the amount of halftone coverage that is determined; and causing, by the processor, the security mark to be printed on the substrate, wherein the security mark is printed with the non-fluorescent toner as a negative image of the electronic file.

2. The method of claim 1, wherein the security mark comprises text or an image.

3. The method of claim 1, wherein the substrate and the non-fluorescent toner have a same color.

4. The method of claim 1, wherein the non-fluorescent toner comprises a white dry ink.

5. The method of claim 1, wherein a difference in brightness between the substrate and the non-fluorescent toner comprise less than a brightness threshold.

6. The method of claim 5, wherein the brightness threshold comprises 1 L* unit.

7. The method of claim 6, wherein the amount of halftone coverage comprises approximately 5 percent to 20 percent.

8. The method of claim 1, wherein the security mark is visible on the substrate under an ultra violet (UV) light.

9. The method of claim 1, wherein a negative of the security mark is printed on the substrate with the non-fluorescent toner.

10. A non-transitory computer-readable medium storing a plurality of instructions, which when executed by a processor, causes the processor to perform operations for printing a security mark via a non-fluorescent toner, comprising:

instructions to receive an electronic file of a security mark to be printed on a substrate;

instructions to determine an amount of halftone coverage for a non-fluorescent toner based on a brightness and halftone correlation stored in memory, wherein the brightness and halftone correlation indicates the amount of halftone coverage of the security mark given a brightness of the substrate, a size of an image of the security mark, and a type of the image of the security mark;

instructions to convert the electronic file of the security mark into a printer description language with the amount of halftone coverage that is determined; and instructions to cause the security mark to be printed on the substrate, wherein the security mark is printed with the non-fluorescent toner as a negative image of the electronic file.

11. The non-transitory computer-readable medium of claim 10, wherein the security mark comprises text or an image.

12. The non-transitory computer-readable medium of claim 10, wherein the substrate and the non-fluorescent toner have a same color.

13. The non-transitory computer-readable medium of claim 10, wherein the non-fluorescent toner comprises a white dry ink.

14. The non-transitory computer-readable medium of claim 10, wherein a difference in brightness between the substrate and the non-fluorescent toner comprise less than a brightness threshold.

15. The non-transitory computer-readable medium of claim 14, wherein the brightness threshold comprises 1 L* unit.

16. The non-transitory computer-readable medium of 15, wherein the amount of halftone coverage comprises approximately 5 percent to 20 percent.

17. The non-transitory computer-readable medium of claim 10, wherein the security mark is visible on the substrate under an ultra violet (UV) light.

18. The non-transitory computer-readable medium of claim 10, wherein a negative of the security mark is printed on the substrate with the non-fluorescent toner.

19. A method for printing a security mark via a non-fluorescent toner, comprising:

receiving, by a processor, an electronic file of a security mark to be printed on a white substrate;

determining, by the processor, locations on the substrate to mask the substrate with a white dry ink to generate a negative of the security mark, wherein the security mark is visible by a brightness of the white substrate under an ultra violet (UV) light;

determining, by the processor, a pattern of a halftone coverage of approximately 5 percent to 20 percent per pixel on the locations that are determined based on a brightness and halftone correlation stored in memory, wherein the brightness and halftone correlation indicates an amount of halftone coverage of the security mark given the brightness of the white substrate, a size of an image of the security mark, and a type of the image of the security mark;

converting, by the processor, the electronic file of the security mark into a printer description language with the locations on the substrate and the pattern of the halftone coverage to print the security mark; and causing, by the processor, the security mark to be printed on the white substrate, wherein the security mark is printed with the white dry ink as a negative image of the electronic file.

20. The method of claim 19, wherein a difference in a brightness of the white dry ink and the white substrate is less than 1 L* unit.

* * * * *